(12) United States Patent
Jaeger

(10) Patent No.: US 6,883,145 B2
(45) Date of Patent: Apr. 19, 2005

(54) ARROW LOGIC SYSTEM FOR CREATING AND OPERATING CONTROL SYSTEMS

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 687 days.

(21) Appl. No.: 09/880,397

(22) Filed: Jun. 12, 2001

(65) Prior Publication Data

US 2002/0109737 A1 Aug. 15, 2002

Related U.S. Application Data

(63) Continuation-in-part of application No. 09/785,049, filed on Feb. 15, 2001.

(51) Int. Cl.[7] ................................................. G09G 5/00
(52) U.S. Cl. ..................... 715/767; 715/769; 715/781; 715/802; 715/810; 715/845; 715/862
(58) Field of Search ................................. 345/767, 864, 345/179, 156, 158

(56) References Cited

U.S. PATENT DOCUMENTS

| | | | |
|---|---|---|---|
| 4,949,388 A | 8/1990 | Bhaskaran | |
| 5,121,442 A | 6/1992 | Tocawa et al. | |
| 5,148,522 A | 9/1992 | Okazaki | |
| 5,301,336 A | 4/1994 | Kodosky et al. | |
| 5,583,542 A | 12/1996 | Capps et al. | |
| 5,583,946 A | 12/1996 | Gourdol | |
| 5,666,113 A | 9/1997 | Logan | |
| 5,724,492 A | 3/1998 | Matthews et al. | |
| 5,740,436 A | * 4/1998 | Davis et al. ................... | 713/1 |
| 5,841,906 A | 11/1998 | Saito | |
| 5,909,211 A | 6/1999 | Combs et al. | |
| 6,020,881 A | * 2/2000 | Naughton et al. .......... | 345/740 |
| 6,034,679 A | 3/2000 | McGrath | |
| 6,097,392 A | 8/2000 | Leverle | |
| 6,335,740 B1 | 1/2002 | Tanaka | |
| 6,459,442 B1 | * 10/2002 | Edwards et al. ............ | 345/863 |
| 6,525,749 B1 | * 2/2003 | Moran et al. ................ | 345/863 |

* cited by examiner

Primary Examiner—Raymond J. Bayerl
Assistant Examiner—Michael Roswell
(74) Attorney, Agent, or Firm—Harris Zimmerman

(57) ABSTRACT

A graphic programming system for associating distinctive arrow appearances to specific transaction(s) that the arrow may convey among and between on-screen objects. The distinctive appearance features include arrow color, arrow style, and double-headed arrows, among many other possibilities. The system provides default relationships between specific arrow transactions and arrow appearance, so that, for example, a arrow of a particular color is recognized by the system (and easily identified by the user) to carry out a particular transaction. These relationships may be selectively varied by the user to suit individual needs.

6 Claims, 14 Drawing Sheets

Volume Sum

Volume Sum

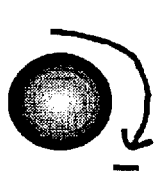 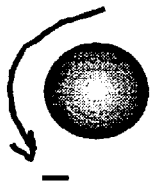 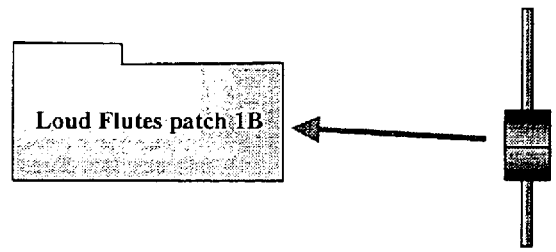
FIG. 32    FIG. 33    FIG. 34A
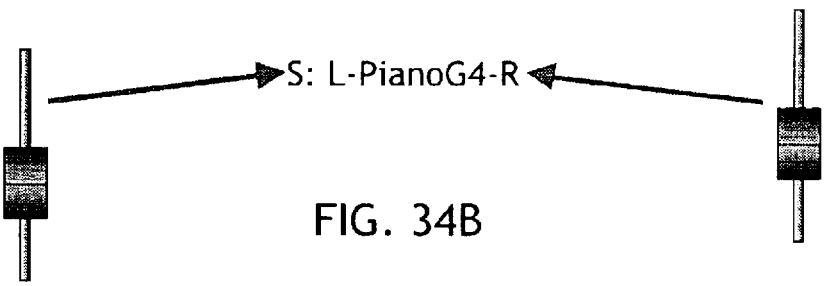
FIG. 34B
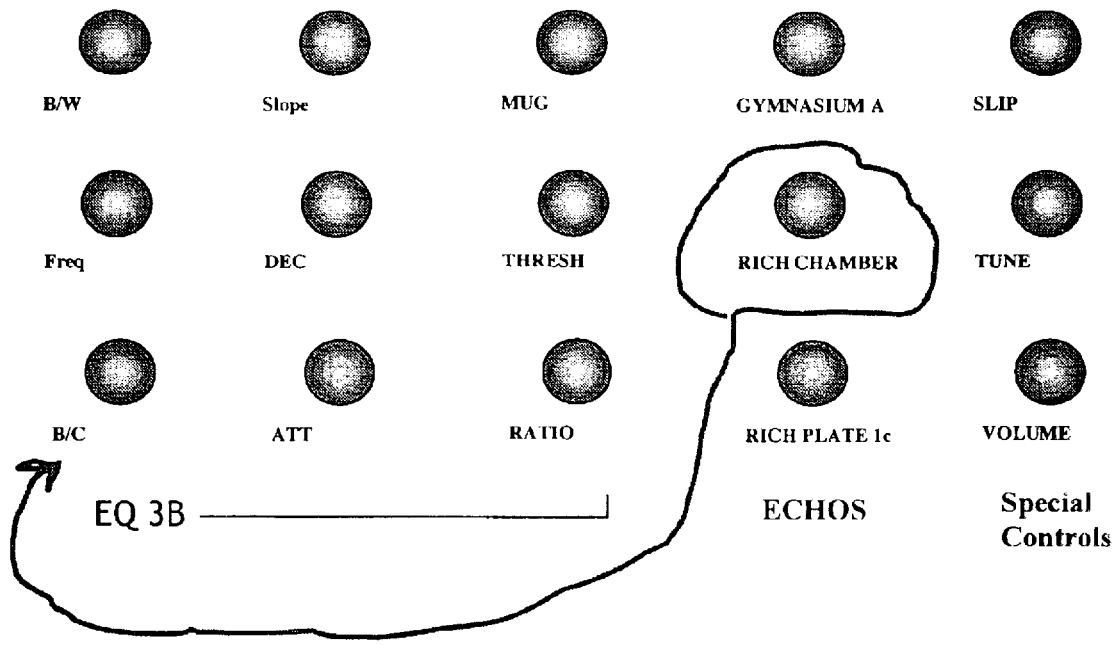
FIG. 35

ARROW LOGIC SYSTEM FOR CREATING AND OPERATING CONTROL SYSTEMS

REFERENCE TO RELATED APPLICATION

This application is a continuation-in-part of application Ser. No. 09/785,049, filed Feb. 15, 2001, for which priority is claimed.

BACKGROUND OF THE INVENTION

The copending patent application captioned above describes a graphical user interface for a machine having a screen display. A significant feature of the interface is that it provides the means for hand drawn entry of on-screen objects which may be associated with functions, files, connections, and other components of a system that the user may thus construct on-screen to carry out the user's desired purpose, whatever it may be. A salient aspect of this interface is the ability to carry out this programming using hand drawn screen objects that may be entered without reference to layers, thus overcoming the need for prior art systems to use multiple layers or windows to accomplish a similar purpose. Furthermore, the objects of this invention may be drawn in such a manner that multiple graphics layers will not inhibit the operation(s), function(s), etc. of one or more such hand drawn graphic objects.

An important feature of the hand drawn user interface is the use of arrow logics to carry out transactions between, from, and among the on-screen objects. Arrow logics involve the hand drawing of arrows between one or more other objects residing on any number of layers—the arrows each conveying a specific transaction relating to one or more of the on-screen objects. The software system carries out recognition of each arrow and also determines which on-screen object(s) is within a default distance to the head, tail, and line of each arrow to associate the transaction conveyed by the arrow with the appropriate on-screen object(s). Note that arrow logics may be applied not only to lines having arrow heads, but to other objects, such as lines or various solid objects, i.e., a long thin rectangle, etc.

SUMMARY OF THE INVENTION

The present invention generally comprises a detailed explication of the arrow logics system disclosed previously in application Ser. No. 09/785,049, filed Feb. 15, 2001, which is incorporated herein by reference.

The invention includes a system for associating distinctive arrow appearances to specific transaction(s) that the arrow may convey. These distinctive appearance features include arrow color, arrow style, and double-headed arrows, among many other possibilities. The system may provide default relationships between specific arrow transactions and arrow appearance, so that, for example, an arrow of a particular color is recognized by the system (and easily identified by the user) to carry out a particular transaction. These relationships may be selectively varied by the user to suit individual needs.

One mode for the user to enter or change the relationship between arrow appearance and transaction is an Info Window, or its equivalent (i.e., task bars, docking bars, menus, interactive icons, etc.), which presents for selection an array of arrow colors, arrow styles, and a listing of arrow transactions. The user may select color, style, and transaction for any one arrow, or may enter changes to default settings that cause any subsequently drawn arrow to be subject to the default changes.

Transactions that may be conveyed by arrows include, but are not limited to: Copy/Replace or Copy/Replace/Delete from screen; Place Inside; Send the signal or contents; and Change. There is also a category of Specialty Arrows, which are arrows having their transactions determined by context, not necessarily by color or appearance. These specialty arrows include, but are not limited to, the following functions: Insert an action or function in the stem of an existing arrow; Rotational direction for a knob or joystick; Apply the control of a device to one or more objects, devices or text; Reorder or redirect a signal path among screen objects; Create multiple copies; and Swap (exchange).

Arrows may also be used to select on-screen objects, either by proximity to the head, tail, or line of an arrow, or by being circumscribed by the line of an arrow, or by being proximate to a vertex in the line of the arrow, etc. Selected objects and associated objects, or the arrow itself, may flash when an arrow is first drawn, and must be touched again by the cursor, a finger, or a screen-drawing implement of the system in order for the arrow to initiate its particular transaction. Thereafter the arrow can either remain visible or disappear, but in the case of the latter, may be made to reappear by the use of a Show Path or Show Control command entered by the user.

The system software is also adapted to recognize text phrases or sentences entered on the screen display by typing, speaking, copying or hand printing or writing. The meaning of any text phrase or sentence may be associated with any arrow that is located within a default distance to the text.

BRIEF DESCRIPTION OF THE DRAWING

FIGS. 32 and 33 are depictions of arrows used to define the counter-default direction for an on-screen knob controller.

FIG. 34A is a depiction of an arrow used to apply a control function of a device to one or more on-screen objects.

FIG. 34B is a depiction of arrows used to apply control functions of two devices to the left and right tracks of an on-screen stereo audio signal object.

FIG. 35 is a depiction of an arrow used to reorder the path of a signal through an exemplary on-screen signal processing setup.

DESCRIPTION OF THE PREFERRED EMBODIMENT

The fundamental concept of arrow logic operations is to draw arrows, or their equivalents, that command transactions to take place between two or more objects presented in or on a graphic display. Moreover, arrow logics provide visually distinct arrows that designate a particular transaction to correspond to each type of arrow. The visible trait of an arrow that is most easily distinguished in a graphic display is color. The assignment of a transaction to a specific color arrow can be carried out in the Global Info Window for arrows. It is also possible to make such an assignment directly in the Arrow Logic Info Window (or its equivalent) or directly on the arrow itself, by entering an arrow logic abbreviation command or its equivalent. (Note that the system provides info windows for objects and for actions.) Once these arrow logic categories are understood, there are a variety of ways of assigning specific category functions to arrows with specific colors.

In the arrow logic system, an arrow drawn on the screen conveys a transaction from the tail of the arrow to the head of the arrow. There is a wide range of arrow transactions, including transactions that extend between screen objects, as well as transactions that apply to a single screen object. When the arrow is drawn on the screen, the operation does not happen immediately. Instead, the arrow and/or object(s) that the arrow pertains to may flicker or change color or anything else that provides an easy to recognize visual change, and will continue to flicker until it is touched (by cursor contact, direct touch on the screen, stylus tap, or the like. Then the flickering stops, the arrows disappear (or return to their original graphical properties, i.e., color, shape, status, location, etc. and remain visible on the screen) and the transaction is completed.

The following is a partial list of transactions that may be carried out using arrow logics.

(a) Copy/Replace or Copy/Replace/Delete from screen
(b) Place Inside
(c) Send the signal or contents to
(d) Change to
(e) Specialty Arrows which are determined by context, not necessarily by color.
(f) Insert an action or function in the stem of an arrow.
(g) Rotational direction for a knob
(h) Apply the control of a device to one or more objects, devices or text.
(i) Reorder or redirect a signal path among screen objects.
(j) Create multiple copies of, and place these copies on the screen display.
k) Swap Utilizing Different Colors for Different Arrow Transactions.

The arrow logics system provides different techniques for assigning arrow colors to particular transactions, in order to accommodate different amounts of flexibility and complexity according to how much each individual user can manage, according to his or her level of experience. The following ways of assigning colors start with the simplest way to utilize arrow Exchange logics and become increasingly more flexible and complicated.

Figure 1:
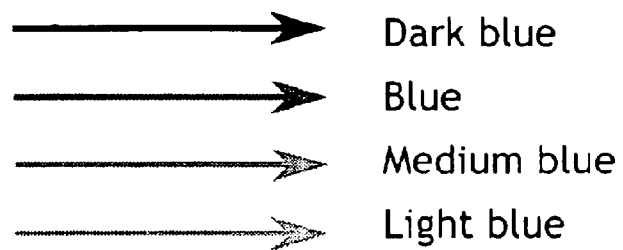
FIG. 1 is a depiction of various color values of arrow components of the arrow logic system of the present invention.
Figure 2:
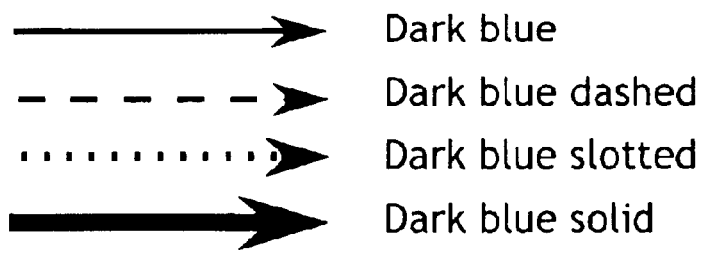
FIG. 2 is a depiction of various styles of arrow components of the arrow logic system.

(a) Lower level user: Assign one arrow color per arrow logic category. With this approach, for each of the above six arrow logic categories, only one color would be used. This requires that only one type of arrow color per category can be used. For instance, a blue arrow could equal a copy/replace/delete arrow transaction, and a green arrow could indicate a "change to" transaction, etc. The user may pick one transaction from a list of possible arrow transaction categories and assign a color to that transaction, and this relationship becomes a default for the system.
(b) Power User: Assign variants of one color for various arrow transactions that are included in each arrow transaction category. For example, as shown in FIG. 1, if the user designates the color blue for copy/replace/delete, the user may choose dark, default, medium and light blue hues for different types of copy/replace/delete functions.
(c) Higher Power User: Assign variants of one color for various arrow transactions that are included in each arrow transaction category, plus variants of line styles for each arrow transaction category. For example, as shown in FIG. 2, line styles such as thin, dashed, dotted, slotted, and solid thick line styles may be employed in addition to the various color hues of FIG. 1. This approach has a lot of flexibility, depending on how many arrow transactions a user may wish to designate with a single color. For instance, the arrow option of FIGS. 1 and 2 may be combined to provide 16 different arrow appearances: four styles of arrows for four different hues of the color blue, and each may be assigned a unique transaction.

Figure 3:
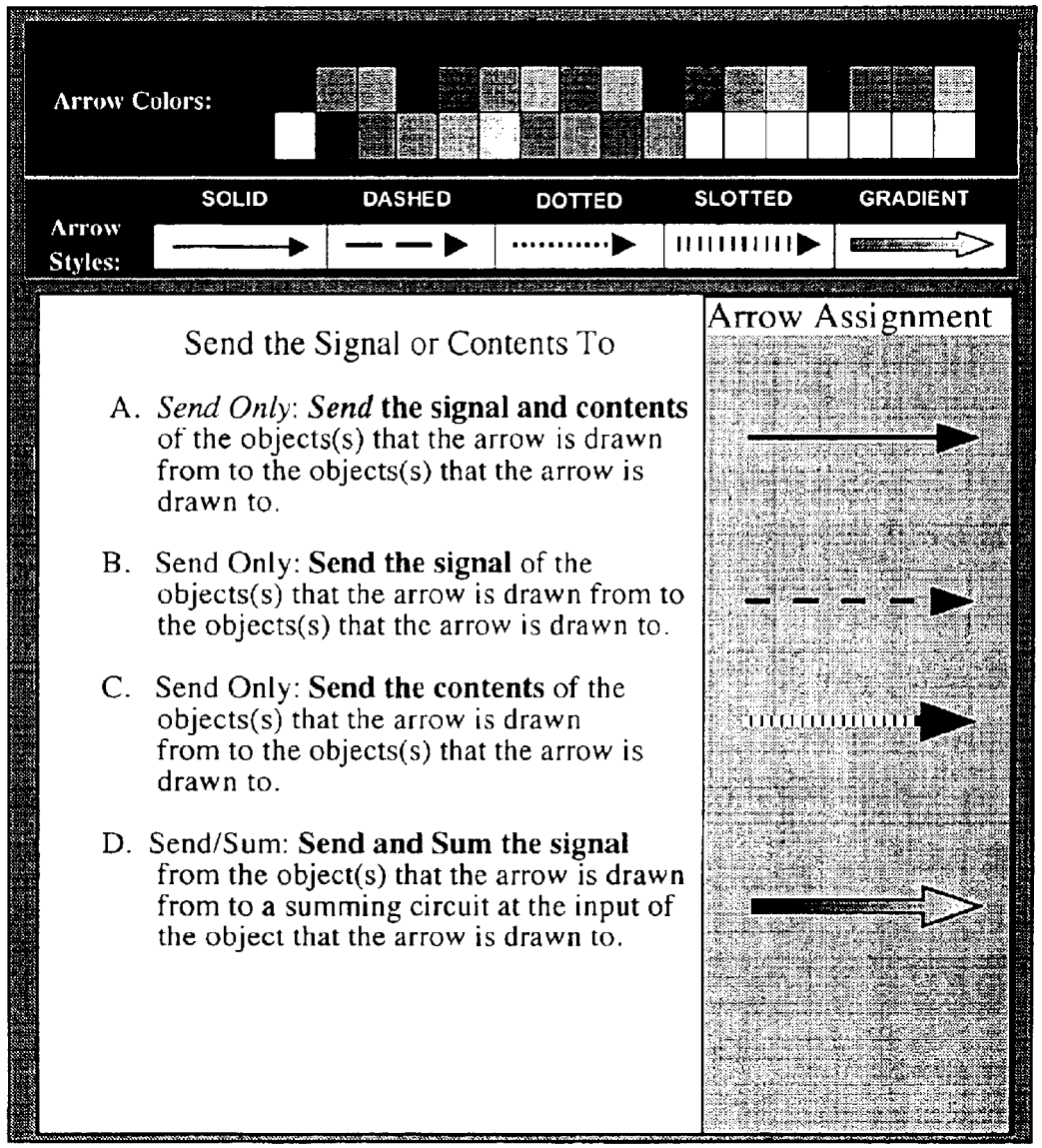
FIG. 3 is a screen shot of a portion of a possible Info Window for the arrow logic system.

To relate each color hue and line style combination to a particular transaction, the user may enter the Info Window for arrow logics or for the specific arrow transaction that is to be assigned; i.e., place inside, send signal, as shown in FIG. 3. Selecting a new function for the selected color (and/or line style) for that transaction establishes the relationship, which can be immediately stored. From that point on, the selected color/line style for that arrow transaction becomes the default, unless altered by use of the Info Window once again.

For instance, if the copy/replace/delete logic color is dark blue and the transaction is: "'Copy the definition' of the object at the tail of the arrow to the object at the front of the arrow," one can change this transaction by selecting a new transaction from a list of possible transactions in the copy/replace/delete Info Window. The assignment of a particular color and line style of an arrow to a particular arrow transaction can be accomplished by drawing the desired arrow (with the selected color and line style) next to the arrow logic sentence that this arrow is desired to initiate. This drawing can take place directly on the Arrow Logic Info Window page as shown in FIG. 3.

NOTE: It is possible for more than one arrow color and/or line style to be assigned to a specific arrow logic. For instance, for the more common arrow transactions, i.e., "control the object and/or device that the arrow is drawn to by the object or device that the arrow is drawn from," such an arrow logic could utilize a blue arrow with a solid line and a green arrow with a solid line, etc. Similarly, it is possible to utilize a single type of arrow, i.e., a green dashed arrow, to simultaneously initiate more than one arrow transaction. To set up such an arrow logic, an arrow could be drawn on the Arrow Logic Info Window across from a specific arrow transaction. Then the same colored arrow with the same style could be drawn across from another arrow logic in the same Info Window.

NOTE: This Info Window can be found inside the Global Arrow Logic Info Window or can be entered directly. Furthermore, other methods to alter an arrow logic or assign an arrow logic include using vocal commands or typing or writing or printing text near the arrow for which its logic is to be changed or initially determined (in the case that such arrow has no logic previously assigned to it.) Another very advanced method of defining an arrow logic for an arrow would be to draw another arrow from an object that represents a particular arrow logic to an existing arrow such that the logic of the object that the arrow's tail points to is assigned to the arrow that the newly drawn arrow points to. If one selects a new transaction, i.e., "'Copy all non-aesthetic properties' of the object that the arrow is drawn from to the object that the arrow is drawn to," the dark blue arrow will have a new copy/replace/delete function. This function can remain until which time it is changed again.

Figure 4:
FIG. 4 is a depiction of a gradient fill arrow component of the arrow logic system.

A further line style variant that may be employed to provide further differentiation among various arrows on the graphic display is a gradient fill, as shown in FIG. 4. This feature may be employed with monocolor arrows, or may gradiate from one color to another. There are several forms of gradient fills that may be used (monocolor, bicolor, light-to-dark, dark-to-light, etc.) whereby the combinations of line hues, line styles, and gradient fills are very numerous and easily distinguished on a graphic display.

Figure 5:
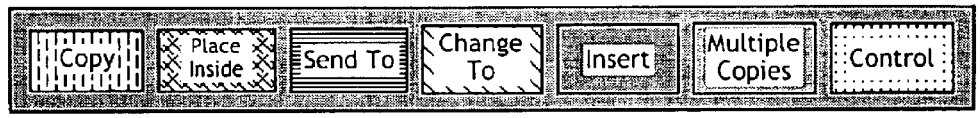
FIG. 5 is a depiction of an arrow color menu bar, hatched to indicate various colors and associated functions that may be selected.
Figure 6:
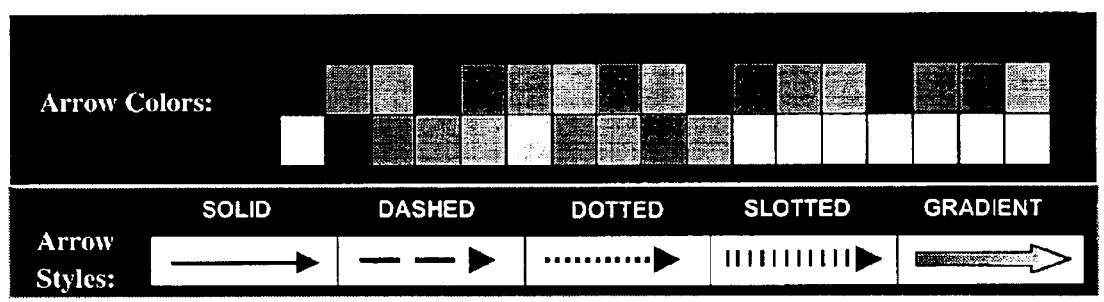
FIG. 6 is a depiction of an arrow menu bar, showing various colors and arrow styles that may be selected.

Line color may be selected from an on-screen menu, as suggested in FIG. 5, in which the hatching indicates different colors for the labeled buttons, and FIG. 6 (not hatched to represent colors), which displays a convenient, abbreviated form of the Info Window to enable the user to select category line styles as well as shades of each color category.

1. COPY/Replace

This function copies all or part of any object or objects at the tail of an arrow to one or more objects at the head of the arrow. If the object that the arrow is drawn to does not have the property that a specific arrow transaction would copy or assign to it, then the arrow performs its "copy" automatically. If, however, the object the arrow is drawn to already has such property or properties, a pop up window appears asking if you wish to replace such property or properties or such object.

Figure 7:
FIG. 7 is a depiction of a copy arrow and the placement of the new copy of the existing object relative to the head of the copy arrow.
Figure 8:
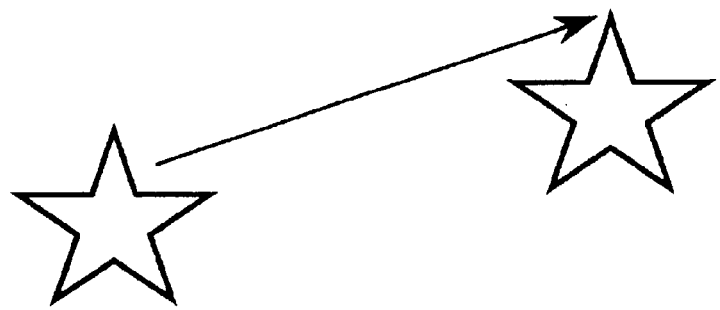
FIG. 8 is a depiction of another copy arrow and the placement of the new copy of the existing star object relative to the head of the copy arrow.
Figure 9:
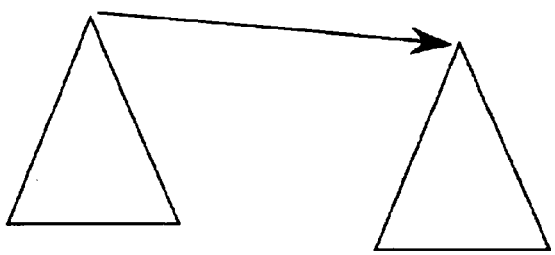
FIG. 9 is a depiction of a copy arrow and the placement of the new copy of the existing triangle object relative to the head of the copy arrow.

For example, as shown in FIG. 7, one may copy the rectangle object (including all properties, i.e., Info Window, automation, aesthetic properties, definition, assignment, action and function) by drawing an arrow from the rectangle to an empty space on the screen display (i.e., a space that is not within a default distance to another screen object). Many different schemes are possible to implement the copy function. One such scheme is that the object is copied so that the front of the arrow points to either the extreme upper left corner or the upper extremity of the object, whichever is appropriate for the object, as shown by the examples of FIGS. 8 and 9. Copying may involve some or all the attributes of the object at the tail of the arrow; for example:

Aesthetic Properties

Copy the color of the object at the tail of an arrow to one or more objects at the head of the arrow.

Copy the shape of the object at the tail of an arrow to one or more objects at the head of the arrow.

Copy the line thickness of the object at the tail of an arrow to one or more objects at the head of the arrow.

Copy the size of the object at the tail of an arrow to one or more objects at the head of the arrow.

Copy all aesthetic properties (except location) of the object at the tail of an arrow to one or more objects at the head of the arrow, etc.

Definition

Copy the definition of the object at the tail of an arrow to one or more objects at the head of the arrow.

Action

Copy the action of the object at the tail of an arrow to one or more objects at the head of the arrow.

Assignment

Copy the assignment of the object at the tail of an arrow to one or more objects at the head of the arrow.

Function

Copy the function of the object at the tail of an arrow to one or more objects at the head of the arrow.

Automation

Copy the automation of the object at the tail of an arrow to one or more objects at the head of the arrow.

Info Window

Copy the Info Window of the object, or the contents of the Info Window, at the tail of an arrow to one or more objects at the front of the arrow.

Figure 43:
FIG. 43 is a depiction of a text entry cursor placed proximate to the arrow of FIG. 42 to enable placement of command text to be associated with the adjacent arrow.

To engage "replace", the user may click in a box for the "replace" option in the appropriate Info Window (or its equivalent) or type "replace" along the arrow stem when typing, writing or speaking a new function for a certain color and style of arrow (see also FIG. 43).

Copy the object (including all properties, i.e., Info Window, automation, aesthetic properties, definition, assignment, action and function) that the arrow is drawn from and replace the object that the arrow is drawn to with such object in the location of the object that the arrow is drawn to.

Copy all non-aesthetic properties of the object at the tail of an arrow and replace those properties in one or more objects at the front of the arrow.

Copy all properties (except location) of the object at the tail of an arrow and replace those properties in one or more objects at the front of the arrow.

Figure 10:
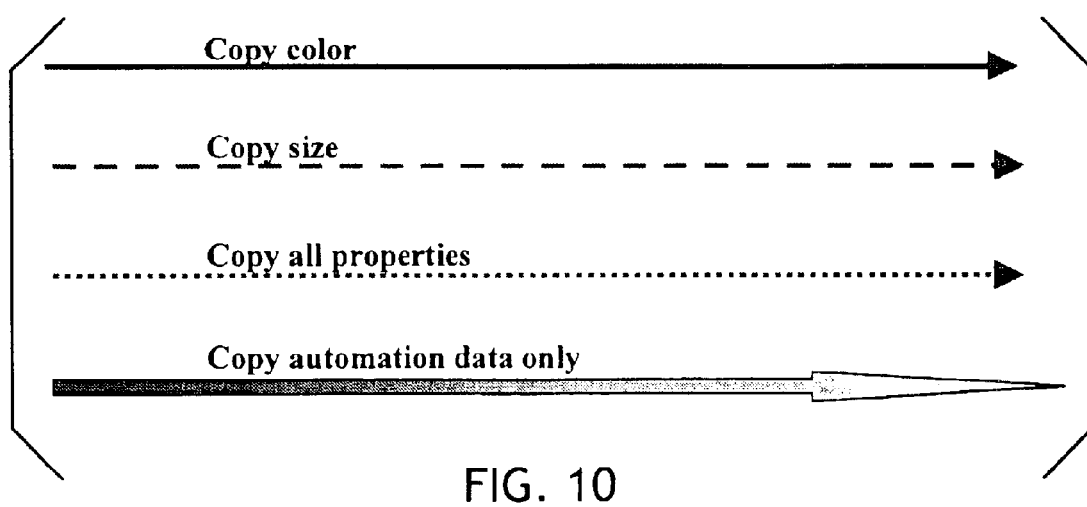
FIG. 10 is a chart of arrow styles indicating the association of various copy transactions with their respective arrow styles. Most importantly, this indicates a user's ability to type, print, write or use a vocal command to reassign an arrow logic to a hand drawn arrow, by using arrow logic abbreviations.

Using arrow logic abbreviations. One feature of arrow logics is that the arrow logic sentences, which can be found in arrow logic Info Windows, menus and the like, can be listed where the first number of words of the sentence are distinguished from the rest of the sentence. One way to do this is to have these first number of words be of a different color, i.e., red, and have the rest of the arrow logic sentence be in another color, i.e., black. (Note that in FIG. 3, the highlighted words of the arrow logic sentences are shown in bold to indicate a color differential) The user can declare or change the logic for any given arrow (or its equivalent, i.e., a line) by typing, writing, printing or speaking just the abbreviation for the arrow logic. This shortcut eliminates the need to enter a long sentence which describes a particular arrow logic. The abbreviation performs the same task. A sample of the use of arrow logic abbreviations entered adjacent to arrow stems to assert the arrow transactions is shown in FIG. 10.

2. Place Inside

Figure 11:
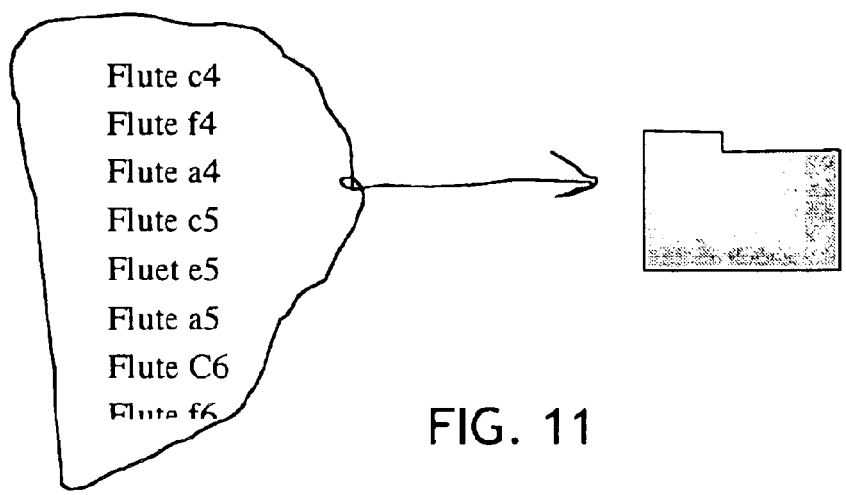
FIG. 11 is a depiction of a hand drawn arrow conveying the transaction of placing a list of music files inside a folder.

With regard to FIG. 11, the "place inside" arrow transaction enables an arrow to place a group of objects inside a folder, icon or switch or other type of hand drawn graphic. An example of this is selecting a group of sound files by drawing an ellipse around them and then drawing a line with an arrow on the end extending from the ellipse and pointing to a folder. This type of drawn arrow will place all of these encircled sound files from the list into the folder. When the arrow is drawn to the object, in this case a folder, the operation may be carried out immediately. An alternative default, which provides the user an opportunity to abort his action, association, direction, etc. caused by the drawing of his arrow, is that the object that the arrow is drawn to (the folder in this case) begins flickering, or, as may be preferred by many users, the arrow itself starts to flicker or change color, etc. The arrow then continues to flicker until it is touched. Once touched, the flickering stops, the arrow and the ellipse disappear and the transaction is completed. NOTE: In order to engage an arrow logic, it is not necessary that the arrow must disappear. However, this is often desirable, because it eliminates having a large number of arrows drawn from object to object all over a display, where the continued visibility of these arrows could interfere with a user's ability to effectively operate and control other graphics, devices, objects, text, etc., on the display. Thus, hiding "engaged" or "implemented" arrows can eliminate confusion and screen clutter, but the implementation of arrow logics is not dependent upon whether any draw arrow remains visible or becomes hidden.

Multiple ellipses and arrows may be able to be drawn around different objects and then one by one the objects that the arrows are pointing to, or the arrows themselves, can be touched to complete the action. By having arrows operate this way, the action of touching a flickering object or arrow can be automated to store the exact moment that the operation of the arrow has been completed for one or more objects.

Figure 12:
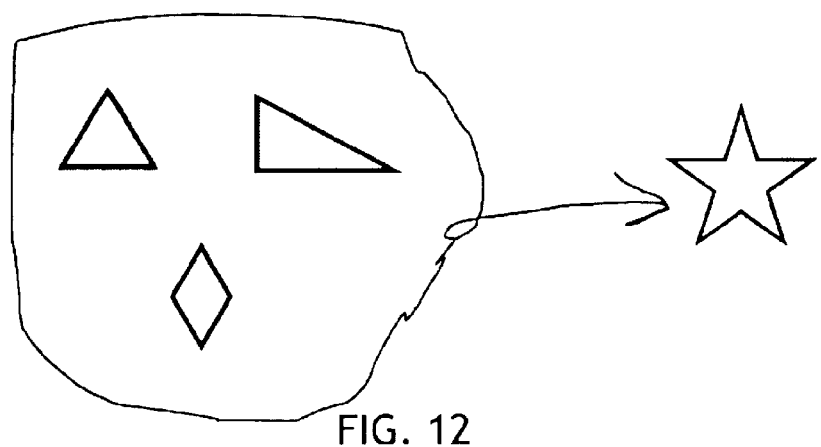
FIG. 12 is a depiction of a hand drawn arrow conveying the transaction of selecting and placing a group of on-screen objects inside an on-screen object.

Another example of a "place inside" transaction, shown in FIG. 12, involves drawing an ellipse to select a group of objects (two triangles and a rhombus) and then placing them inside another object, a star object. By double clicking on the star, the objects that have been placed inside it can be made to fly back out of the star and resume the locations they had before they were placed inside the star object. Thus, placing objects inside another object, i.e., the star of FIG. 12, carries the advantage of enabling a user to draw a single object to immediately gain access to other objects. Access to these other objects can take many forms. Below are two examples:

(1) Utilizing a single object to apply the processes, features, actions, etc. of the devices contained within this single object to other objects, text, devices, etc. These other objects could represent a group of devices that can be applied to process a sound or device or object by drawing an arrow from, for example the star of FIG. 12, to another object, like a sound file. But these devices may be utilized while they remain hidden inside the star, as shown in FIG. 12. By drawing an arrow from the star to a sound file or vice versa (depending upon the desired signal flow), all of the processing contained within the star may be immediately applied to the sound file, although the individual processors (represented by objects inside the star) never need to be viewed. These processors can be used to process the sound file without being directly accessed. Only a connection to the star (the object containing these processors) needs to be established.

(2) Accessing the processes, features, actions, etc. of the devices contained within a single object by having them fly out of the single object. Like example one above, the objects in the star can represent processors or any type of device, action, function, etc. By doubling clicking on the star, the individual objects stored in the star may "fly out"; i.e., reappear on the display. By further clicking on each individual object, the controls for the processor that each object represents can fly out of each object and appear on screen. These controls can then be used to modify a processor's parameters. Once modified, these controls can be made to fly back into the graphic, i.e., equilateral triangle, diamond, etc. and then in turn these objects can be made to fly back into the star, as depicted in FIG. 12. The underlying concept is to be able, by hand drawing alone, to gain access to virtually any level of control, processing, action, definition, etc. without having first to search for such things or having to call them up from a menu of some kind. This type of hand drawing provides direct access to an unlimited array of functions, processes, features, actions, etc. Such access can be initiated by simply drawing an object (that represents various functions, processes, features, actions, etc.) anywhere and at any time on a display.

Figure 13:
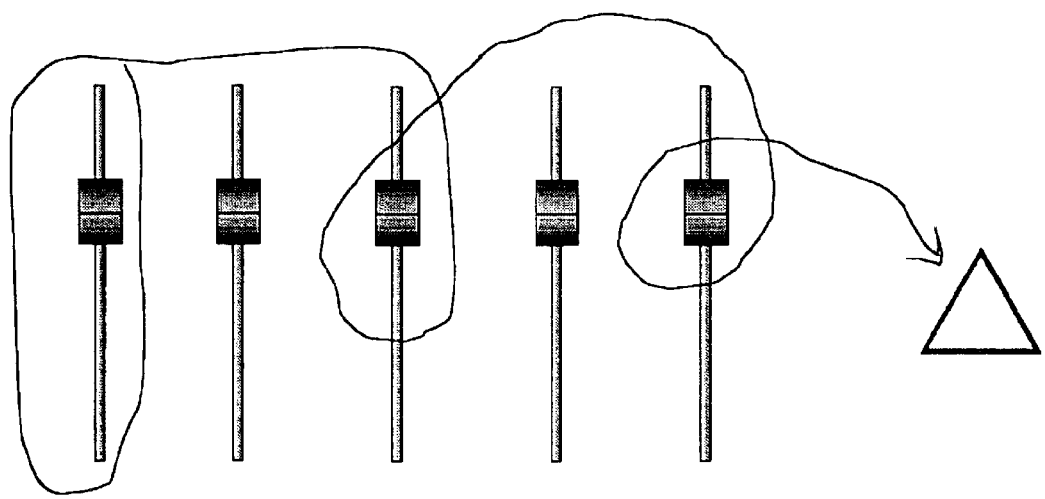
FIG. 13 is a depiction of a hand drawn arrow conveying the transaction of selecting and placing a group of on-screen devices and/or objects inside an onscreen object.

In a further example, shown in FIG. 13, a line is drawn continuously to circumscribe the first, third, and fifth fader controllers, and the arrowhead at the end of the line is proximate to a triangle object. This arrow operation selects the first, third, and fifth controllers and places them in the triangle object. FIG. 13 illustrates an arrow line being used to select an object when such line circumscribes, or substantially circumscribes, an object(s) on the screen display.

Figure 14:
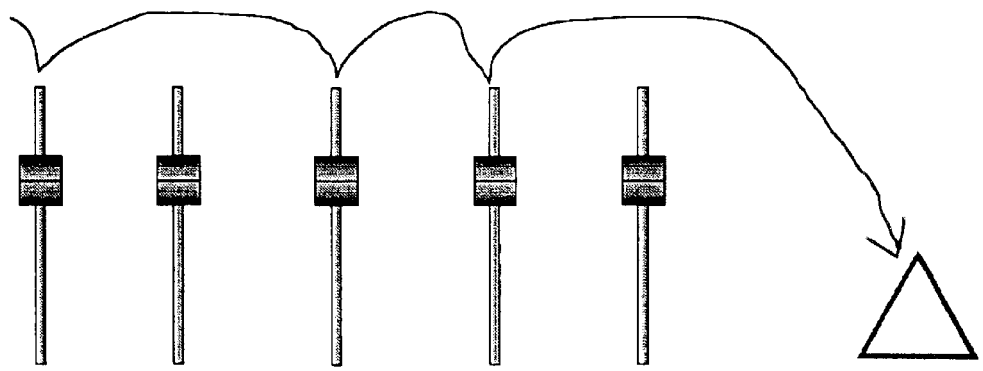
FIG. 14 is a depiction of another graphical method of using a hand drawn arrow to convey the transaction of selecting and placing a group of onscreen devices and/or objects inside an on-screen object.

In the example of FIG. 14, a line is drawn continuously and includes vertices that are proximate to the first, third, and fourth fader controllers. The software recognizes each vertex and its proximity to a screen object, and selects the respective proximate objects. The arrowhead proximate to the triangle directs the arrow logic system to place the first, third, and fourth fader controllers in the triangle.

An alternate method of accomplishing this same task involves a group of objects that are selected and then dragged over the top of a switch or folder. The switch itself becomes highlighted and the objects are placed inside the switch and the switch takes on the label of the group of objects or a single object, as the case may be.

Figure 15:
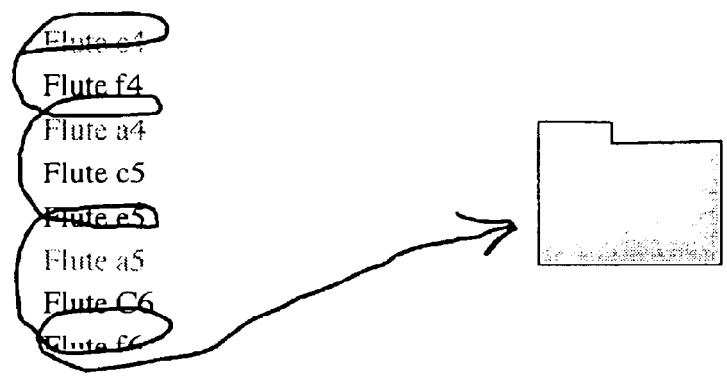
FIG. 15 is a depiction of a hand drawn arrow conveying the transaction of selecting and placing a list of music files inside a folder, where the selected and placed file names become grayed out.

As shown in FIG. 15, one or more files in a list of sound files on the screen may be chosen by drawing a line about each one and extending the arrow head to an object, in this case, a folder. As each object in the list (or group of the preceding examples) is encircled, or partially encircled, in a hand drawn ellipse, it may change color or highlight to show that it has been selected. In the example of FIG. 15, only the selected text objects will be highlighted, and after the flickering folder object or arrow is touched, the selected objects will disappear from the list (or be grayed out on the list, etc.) and be placed into the folder. One value of this technique is to show which files in the list have been copied into the folder and which ones in the list remain uncopied.

Figure 44:
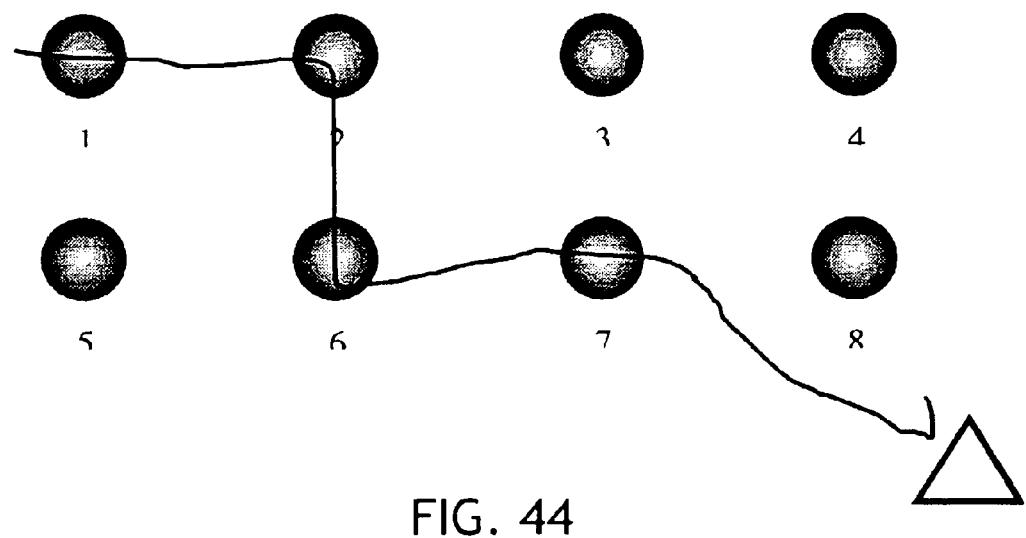
FIG. 44 is a depiction of an arrow drawn through a plurality of objects to select these objects.

With regard to FIG. 44, another technique for selecting multiple objects with an arrow is the use of a "line connect mode". This mode involves drawing an arrow stem to intersect one or more objects which are thus automatically selected. These selected objects can, with the use of an arrow logic, be assigned to, sent to, summed to, etc. another object and/or device or group of objects and/or devices at the head of the arrow. In this example, the arrow associates knobs 1, 2, 6, and 7 to a single object, a triangle. The arrow transaction for this assignment is in accordance with the color, line style and or context that this arrow is drawn and according to the arrow logic assigned to that graphic combination.

Copy and Place Inside:

Place all objects at the tail of an arrow into the object at the head of the arrow. Furthermore, do not erase the original objects from the screen after they are placed in the object to which the arrow is pointing. The files that have been selected by the hand drawn ellipse and then copied to the folder become grayed out, rather than completely deleted from the list. This way the user can see that these files have been copied to an object and that the other files (the non-grayed out files) have not been copied to the folder, similar to the showing of FIG. 15.

3. Send the Signal or Contents to:

This arrow transaction is designed for the purpose of processing or controlling one or more objects, devices, texts, etc. with another object, text, device, etc. Thus an arrow may be drawn to send the signal of a console channel to an echo unit or send a sound file to an equalizer. This arrow transaction could also be used to send the contents of a folder to a processor, i.e., a color correction unit, etc.

Send Only

Figure 16:
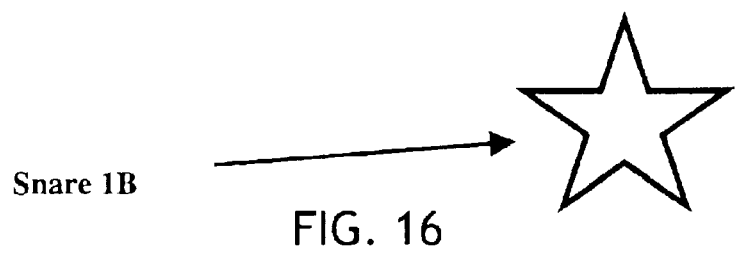
FIG. 16 is a depiction of an arrow directing a signal path from a sound file to an on-screen object which may represent some type of sound process.
Figure 17:
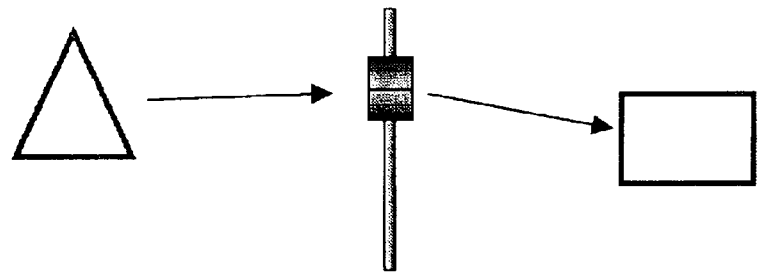
FIG. 17 is a depiction of the use of multiple arrows to direct a signal path among multiple on-screen devices and/or objects.

This arrow transaction sends the signal or contents of the object(s) at the tail of the arrow to the object(s) at the head of the arrow. As shown in FIG. 16, one example includes a star designated as an echo chamber. By drawing the arrow from the snare sound file 'snare 1B' to the star, the snare sound signal is commanded to be sent to that echo chamber. In another example, shown in FIG. 17, a triangle equals a group of console channels. The signals from these console channels are directed by one arrow to a fader, and the signals from the fader are directed by another arrow to a generic signal processing channel, which is represented by a rectangle. The actions are by no way limited to audio signals. They can be equally effective for designating control and flow between any types of devices for anything from oil and gas pipelines to sending signals to pieces of test or medical equipment, processing video signals, and the like.

NOTE: Generally, in the illustrations herein, the head and tail of an arrow must be within a default distance from an on-screen object in order to couple the transaction embodied in the arrow to the object, unless the arrow is governed by a context, which does not require a gap default of any kind. The default distance may be selectively varied in an Info Window to suit the needs of the user.

Send/Sum

Figure 18:
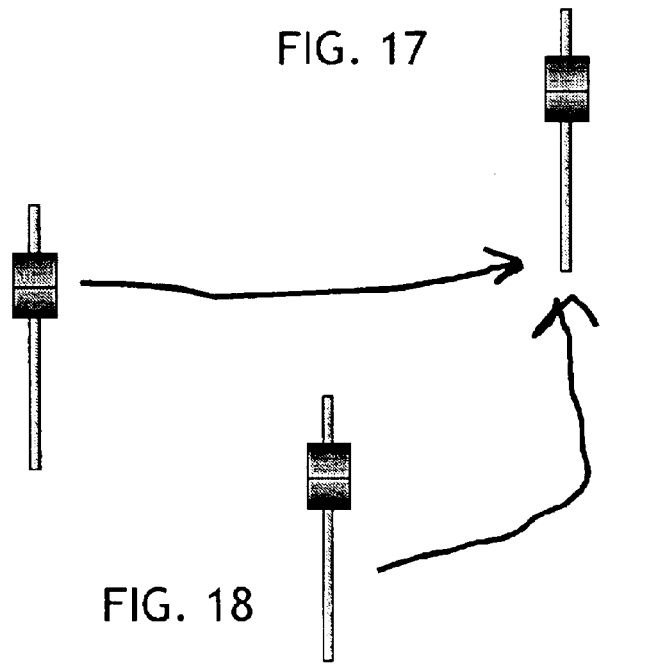
FIG. 18 is a depiction of two arrows used to direct a send/sum transaction from two on-screen controllers to a third on-screen controller.

This arrow transaction sends the signal or contents of the object(s) at the tail of the arrow to a summing circuit at the input of the object at the head of the arrow. With regard to FIG. 18, one example of "send/sum" includes a pair of fader controllers, each having an arrow drawn therefrom to a third fader controller. The software may interpret the converging arrows to designate that the signals from the pair of faders are to be summed and then controlled by the third fader. Depending on default context assignments, it may be necessary to designate an arrow color for the two arrows of FIG. 18 to impart the summing transaction to the third fader, otherwise two signals entering a single component may be interpreted to be ambiguous and not permissible.

Figure 19:
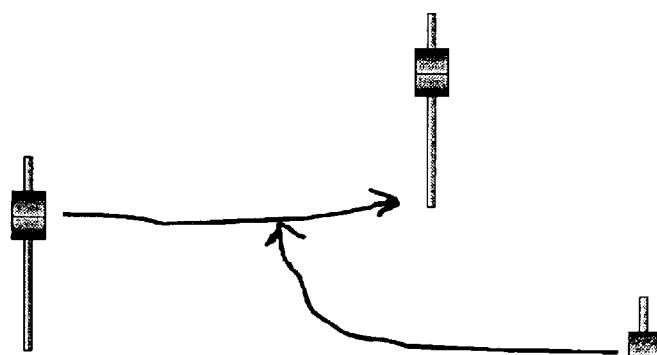
FIG. 19 is a depiction of another example of two arrows used to direct a send/sum transaction from two on-screen controllers to a third on-screen controller.

As shown in FIG. 19, a first arrow may be drawn from one fader controller to a second fader controller, and a second arrow may be drawn from a third fader controller to the first arrow. This construction also commands that the signals from the first and third faders are summed before being operated on by the second fader. Thus the construction of FIG. 19 is equivalent to that of FIG. 18.

Figure 20:
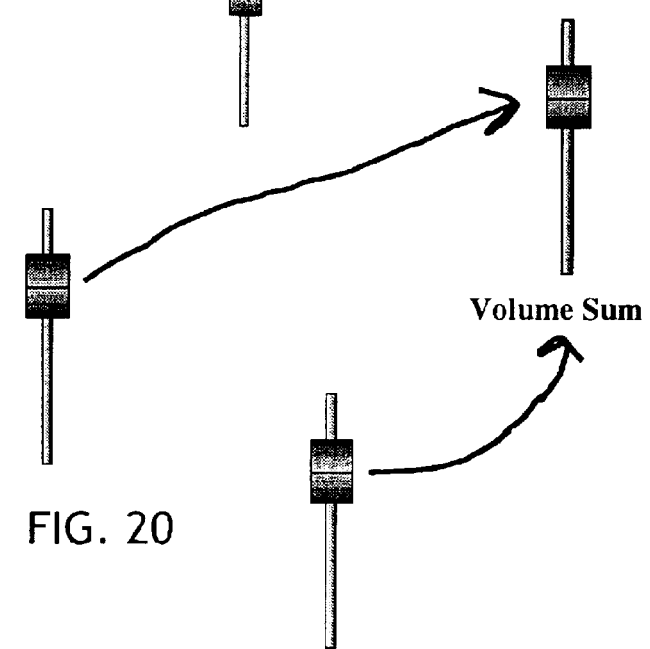
FIG. 20 is a further depiction of two arrows used to direct a send/sum transaction from two on-screen controllers to a third on-screen controller.
Figure 21:
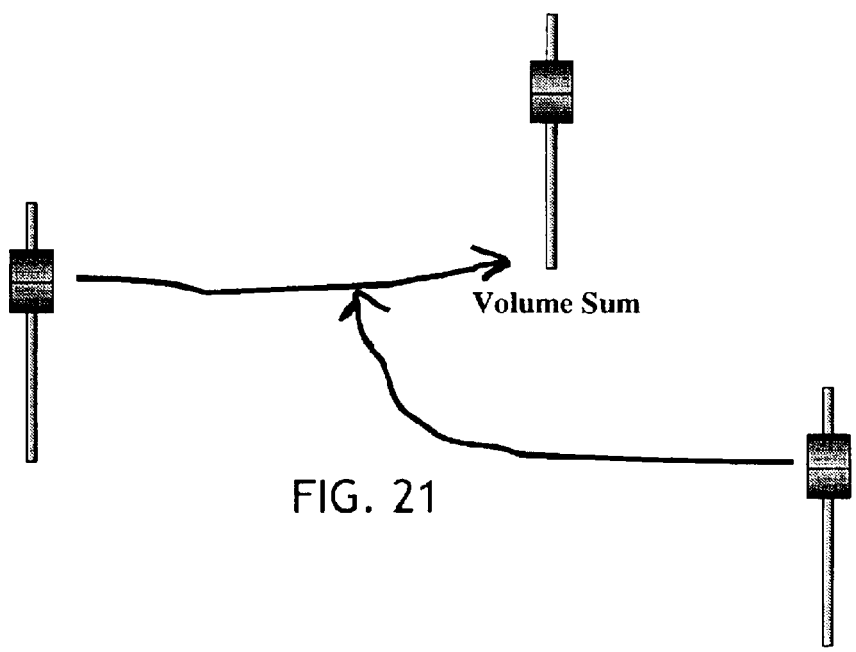
FIG. 21 is another depiction of two arrows used to direct a send/sum transaction from two on-screen controllers to a third on-screen controller.

With regard to FIG. 20, the send/sum transaction may be set forth in a specific context, thereby eliminating the need for a special arrow color or appearance to direct the summing function of two inputs to a screen object. In this example, a fader is drawn on the screen, and labeled "Volume Sum" (by spoken word(s), typed label entry, etc.). The software recognizes this phrase and establishes a context for the fader. Thereafter, arrows of no special color or style may be drawn from other screen objects, such as the two other fader controllers shown in FIG. 20, to the Volume Sum fader, and the signals sent to the Volume Sum fader can be added before being processed thereat. Likewise, as shown in FIG. 21, the construction of FIG. 19 (arrow drawn to arrow line) may be combined with a particular context (Volume Sum) to enable the send/sum transaction to occur without requiring specific arrow colors or styles. Note: The arrows shown in FIGS. 20 and 21 may utilize specific arrow colors and styles if these are desired by the user. Such arrows and styles may or may not be redundant, but certainly they could improve ease of use and ongoing familiarity of user operation.

4. Change to

Figure 22:
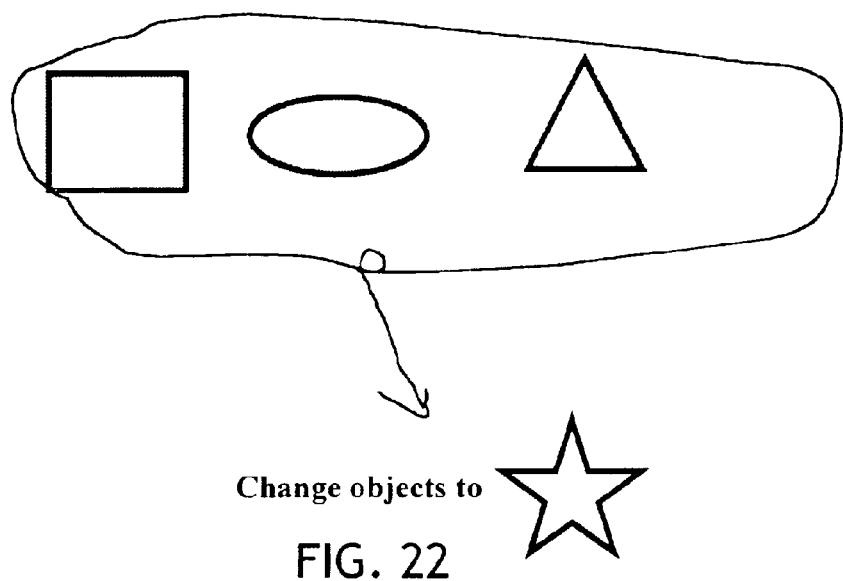
FIG. 22 is a depiction of an arrow used to select and change a group of on-screen objects to another object.

One or more objects may be selected by being circumscribed by an arrow line which extends to another object. Text may be entered by voice, typing, printing, writing, etc. that states "change object to," a phrase that is recognized by the software and directed by the arrow. The transaction is that all the selected objects are changed to become the object at the head of the arrow. Thus, as shown in FIG. 22, the square, ellipse and triangle that are encircled by the arrow are commanded to be changed to the star object at the head of the arrow. Note: such encircling arrow line does not have to be an enclosed curved figure. It could be a partially open figure.

Figure 23:
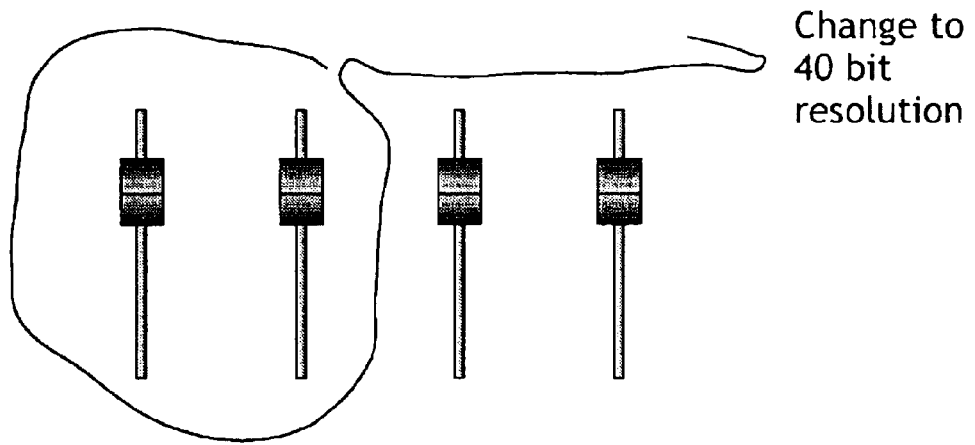
FIG. 23 is a depiction of an arrow used to select and change a property of multiple on-screen objects.

The "change to" arrow transaction may also be used to alter the signal or contents of the object at the tail of the arrow according to the instructions provided for by text and/or objects at the head of the arrow. As shown in FIG. 23, the two fader controllers at the left may be encircled by an arrow that is drawn to a text command that states "change to 40 bit resolution." In this case, only the two leftmost faders would be selected and modified in this manner.

5. Specialty Arrows

Specialty arrows convey a transaction between two or more objects on screen, and the transaction is determined by the context of the arrow, not necessarily by the color or appearance of the arrow. To avoid confusion with arrows having color or appearance associated with specific transactions, the specialty arrow category may make use of a common color or appearance: e.g., the color cement gray, to designate this type of arrow. Specialty arrow transactions (arrow logics) may include, but are not limited to, (a) Insert a modifier, action or function in the stem of an arrow;
(b) Rotational direction for a knob;
(c) Reorder the signal flow or the order of devices in a list;
(d) Apply the control of a device to one or more objects, devices or text.
(e) Create multiple copies of, and place these copies on a screen display.
(f) Exchange or swap—requires color for specific applications other than default.

Figure 24:
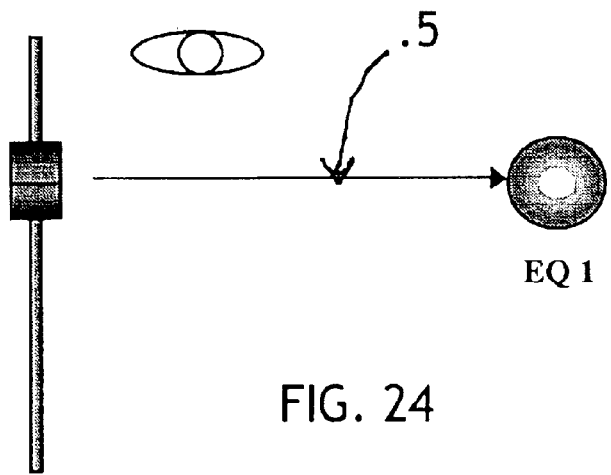
FIG. 24 is a depiction of an arrow used to modify a transaction property of a previously drawn arrow.

As shown in FIG. 24, a specialty arrow may be used to insert a modifier in an arrow stem for an existing action, function, control, etc. This technique enables a user to insert a parameter in the stem of a first arrow by drawing a second arrow which intersects the stem of the first arrow and that modifies the manner in which the first device controls the second. In this case, the user inserts a specifier in an arrow stem to, for example, alter the ratio or type of control. The inserted '0.5' text conveys the command that moving the fader a certain amount will change the EQ1 control by half that amount.

In order to enter a specialty arrow as in FIG. 24 (or elsewhere herein) it may be necessary to use the "Show Control" or "Show Path" command, or its equivalent, to make visible the arrows that have been previously activated and thereafter hidden from view. This "Show" function may be called forth by a pull-down menu, pop-up menu, a verbal command, writing or printing, or by drawing a symbol for it and implementing its function. For example, the circle drawn within an ellipse, which may represent an eye, may be recognized as the Show Path or Show Arrow command. Once this object is drawn, a graphic which shows the control link between the fader and the knob will appear. At this point, the user may draw an arrow that intersects this now visible link between the fader and the knob to create a modification to the type (or ratio) of control. There can be a system default stating that a 1:1 ratio of control is implied for any arrow transaction; thus, for example, for a given amount of change in the fader, that same amount of change is carried out in the knob, which is being controlled by that fader. But the addition of the arrow modifier extending from the 0.5 symbol modifies the relationship to 2:1; that is, for a given amount of change in the fader, half that much change will occur in the knob that is being controlled by that fader.

Alternatively, the modifying arrow may be entered when the first arrow is drawn (from the fader to the knob in FIG. 24) and begins to flicker. The second, modifier arrow may be drawn while the first arrow is flickering, and the two arrows will then flicker together until one of them is touched, tapped, or clicked on by a cursor, causing the arrow transactions to be carried out.

In either case, the context of the second modifier arrow is recognized by the arrow logic system. The second arrow is drawn to a first arrow, but the second arrow does not extend from another screen object, as in FIGS. 19 or 21; rather, it extends from a symbol that is recognized by the system to impart a modifier to the transaction conveyed by the first arrow. Thus the context determines the meaning of the arrow, not the color or style of the arrow.

Figure 25:
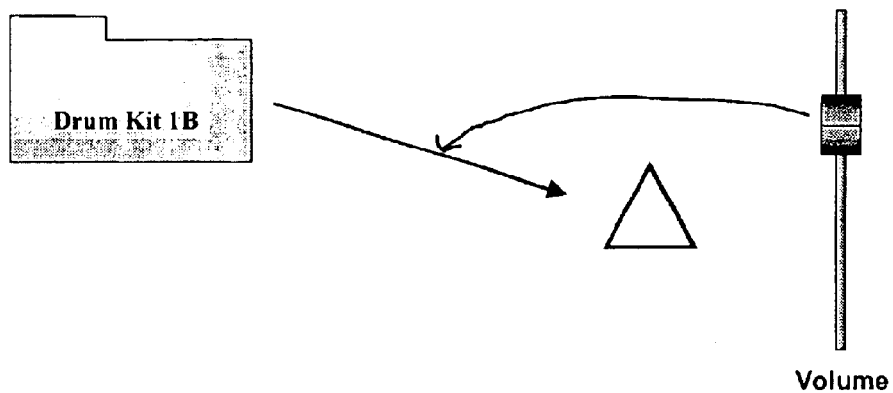
FIG. 25 is a depiction of an arrow used to apply the function of an onscreen controller to a signal being conveyed by another arrow to another onscreen object.

With regard to FIG. 25, the context of an arrow may be used to determine the conveyance of an action or function. This technique enables a user to insert another device, action, function etc., in the stem of an arrow by drawing a second arrow which points to (is within a gap default), or intersects the stem of the first arrow and which extends from the inserted device, action, function, etc. In this example, the volume fader is interposed between the drum kit 1B signal source and the triangle, which may represent a signal processing function of some defined nature, so that the fader adjusts the volume of the signal that is transferred from the drum kit 1B folder to the triangle object. A default of this approach which is protective to the user may be that the inserted arrow must be the same color as the first arrow. On the other hand, a context may be used to determine the transaction, regardless of arrow color or style. The context can be the determining factor, not requiring a special color and/or line style to denote a particular arrow logic, namely: insert whatever device is drawn at the tail of the arrow, which is pointing to the existing arrow stem.

NOTE: Color can be used to avoid accidental interaction of arrows. For instance, arrow lines which are not the same color as existing lines may be draw across such existing lines without affecting them. In other words, it can be determined in software that drawing another arrow, that intersects with an existing arrow, will not affects the first arrow's operation, function, action, etc., unless the second arrow's color is the same as the first arrow's color. In this case, by choosing a different color, one can ensure that any new arrow or object drawn near or intersecting with an existing arrow or object will avoid any interaction with the existing arrow or object. Default settings in the arrow logic system can specify the conventions of color used to govern these contexts.

Figures 26, 27, 28:
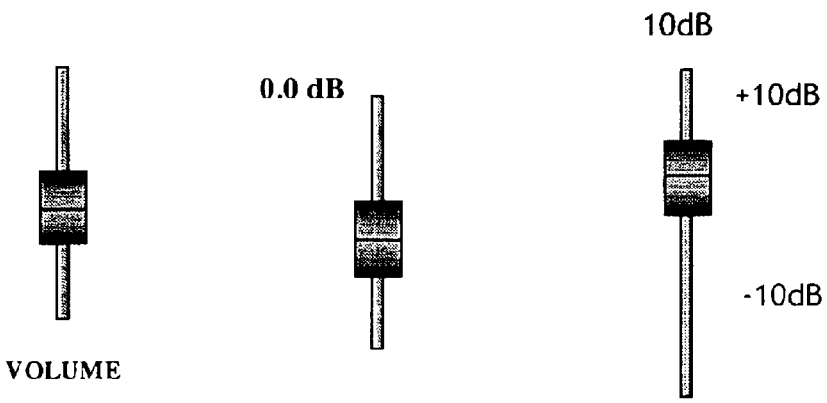
FIG. 26 is a depiction of one technique for labeling an on-screen object with a word or phrase that imparts recognized functional meaning to the object.
FIG. 27 is a depiction of another technique for labeling an on-screen object with a word or phrase that imparts recognized functional meaning to the object.
FIG. 28 is a depiction of a further technique for labeling an on-screen object with a word or phrase that imparts recognized functional meaning to the object.

It is noted that other non-arrow methods may be used to impart an action or function or modifier to screen objects. As shown in FIG. 26, once a fader or other controller is drawn on a screen display, a control word such as "Volume" may be spoken, typed or written into the system at a location proximate to the fader. The system then recognizes the word and imparts the function 'volume' to the adjacent fader. Another implementation of this idea is shown in FIG. 27, where typing, writing or speaking the entry "0.0 dB" proximate to the existing fader accomplishes two things: 1) It determines the resolution and range of the device (fader). For example, "0.0" establishes control of a variable to tenths of dB, and a range of 0.0–9.9. If "0.00" were entered, this would mean hundreds of dB control, etc.; 2) It determines the type of units of control that the device (fader) will operate with. In the case of this example, "dB" or decibels is the unit. If "ms" (milliseconds) were designated, then this device's units would be time. If "%" (percent) were entered, then this device's units would be percent, etc.

An additional embodiment of this idea can be seen in FIG. 28, where the entry of the scale factors "+10 dB" and "−10 dB" proximate to and placed along the track of a fader controller causes not only the fader to be recognized as a dB controller, but also that the fader's scaling is user defined. That is, the distance between the +10 dB text and the −10 dB text defines the scaling for this fader device. In other words, it defines the rate of dB change for a given distance of fader movement—the movement of the fader cap along the fader track. Therefore, the distance between the ±10 dB labels corresponds to the fader cap positions that in turn yield the labeled control (up 10 dB or down 10 dB). This context-driven function entry also may also cause a label "10 dB" to be placed at the top of the fader track.

Figures 29, 30:
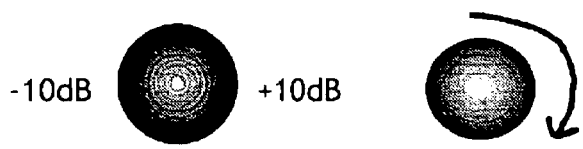
FIG. 29 is another depiction of a technique for labeling an on-screen object with a word or phrase that imparts recognized functional meaning to the object.
FIGS. 30 and 31A are depictions of arrows used to define the rotational direction of increasing value for an on-screen knob controller.

A scale factor may be applied in the same manner to a knob controller, as shown in FIG. 29, with the angular span between the scale labels representing ±10 dB range of the knob controller.

Figures 31A, 31B:
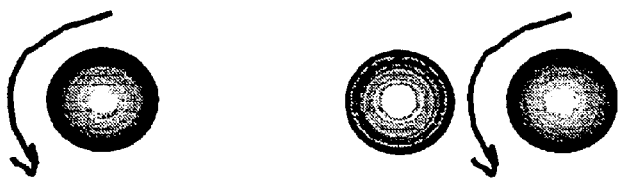
FIG. 31B is a depiction of the context of arrow curvature concentric to a knob, the context being used to determine which knob is associated with the arrow.

With regard to FIGS. 30 and 31A, specialty arrows may be used to indicate the direction of rotation of a knob controller (or translation of a fader cap's movement). The context elements (curved arrow, drawn proximate to a knob controller), create a relationship in which the knob function increases with clockwise rotation (toward the head of the arrow), and the arrow of FIG. 31A specifies a counterclockwise increase in knob function. However, it is possible to overcome any defined action, as shown in FIGS. 32 and 33, by entering the nature of the function change as the knob is rotated in the arrow direction. FIG. 32 specifies negative change in the clockwise direction, and FIG. 33 specifies negative change in the counterclockwise direction, both the opposite of FIGS. 30 and 31.

This example raises another instance in which the system is designed to be context-sensitive. With reference to FIG. 31B, the curved arrow drawn between two knob controllers may appear to be ambiguous, since it is sufficiently proximate to both screen objects to be operatively associated with either one. However, the curvature of the arrow may recognized by the arrow logic system (through processes described in the parent application referenced above), and this curvature is generally congruent with the knob on the right, and opposed to the curvature of the knob on the left. Alternatively, the system may recognize that the curved arrow partially circumscribes the right knob, and not the left knob. In either case, the context determines that the arrow transaction is applied to the knob on the right.

Specialty arrows may further be used to apply the control function of a device to one or more objects, devices, text, etc. When it is utilized in a context situation, the color or line style of the arrow is not necessarily important. Any color or line style may work or the one color (gray) specified above for context arrows may be used. The important factor for determining the control of an unlabeled device (fader, knob, joystick, switch, etc.) is the context of the hand drawn arrow drawn from that device to another device. As shown in FIG. 34A, drawing an arrow from a functional fader (a fader with a labeled function, i.e., Volume) to another object, in this case a folder that contains a number of sound files, will automatically apply the function of that fader, knob, joystick, etc. to the object to which it is drawn. In this case, the context is "controlling the volume of". There can be no other interpretation for this device (fader). It is a volume fader, so when an arrow is drawn from it to a folder containing a group of sound files, the fader controls the volume of each sound file in the folder. As in all the previous examples, the arrow transaction is invoked if the tail of the arrow is within a default distance to any portion of the fader controller screen object, and the head of the arrow is within a default distance of the folder containing the sound files.

In a further example, shown in FIG. 34B, a pair of fader controllers are arrow-connected to respective left and right tracks of sound file "S: L-PianoG4-R". The context of the two fader controllers linked by respective arrows to the left and right sides of the text object is interpreted by the software to indicate that each fader controls the respectively linked track of the stereo sound file.

A further use for specialty arrows is to reorder a signal path or rearrange the order of processing of any variable in general. As shown in FIG. 35, reordering can involve drawing an ellipse or an intersecting line or a multiple vertex line to select a group of devices and then drawing an arrow from this selected group of devices, which can be functional devices, to a new point in a signal path. When the arrow is drawn, it may start to flicker. Touching the flickering arrow completes the change in the signal path.

Note: if a user is familiar with this system and is confident about using arrows, the use of flickering arrows or objects may be turned off. In this case, when an arrow is drawn, the action, function, etc. of that arrow would be immediately implemented and no flickering would occur. Needless to say, any such arrow action could be aborted or reversed by using an undo command or its equivalent. The arrow of FIG. 35 moves the Rich Chamber echo to the input of the EQ 3B (a general signal processing device). This change in signal path causes the signal to flow first into the echo Rich Chamber and then into the EQ 3B.

Figure 36:
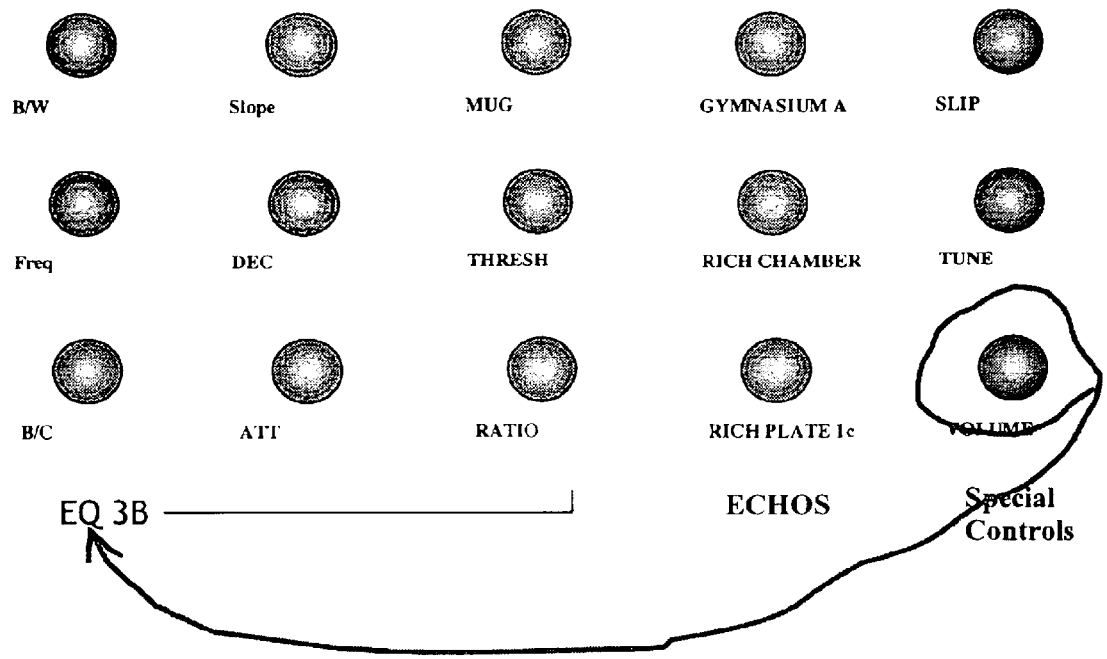
FIG. 36 is another depiction of an arrow used to reorder the path of a signal through an exemplary on-screen signal processing setup.
Figure 37:
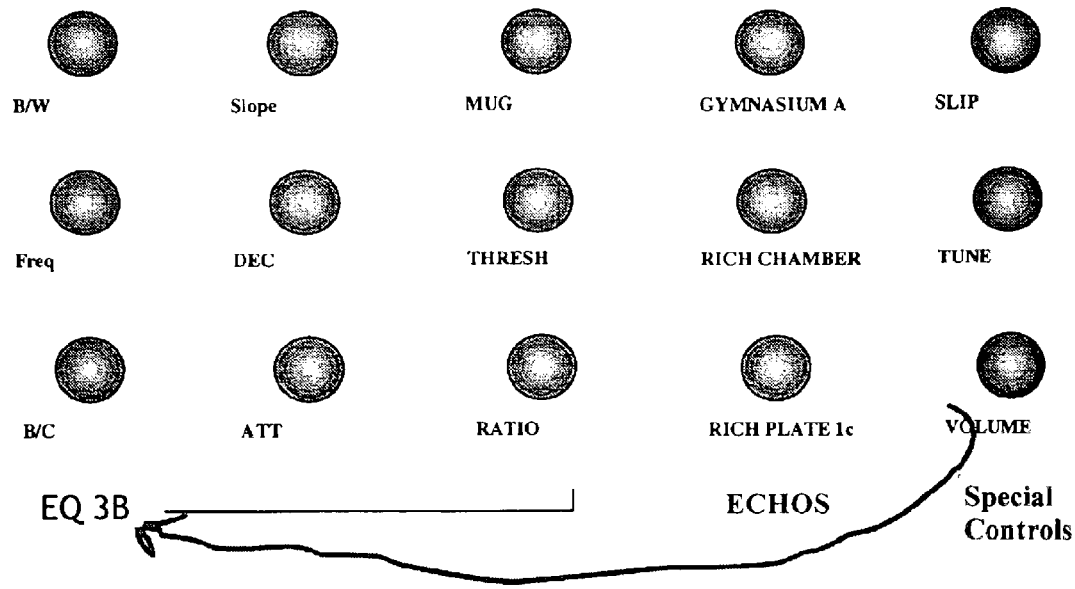
FIG. 37 is a further depiction of an arrow used to reorder the path of a signal through an exemplary on-screen signal processing setup.
Figure 38:
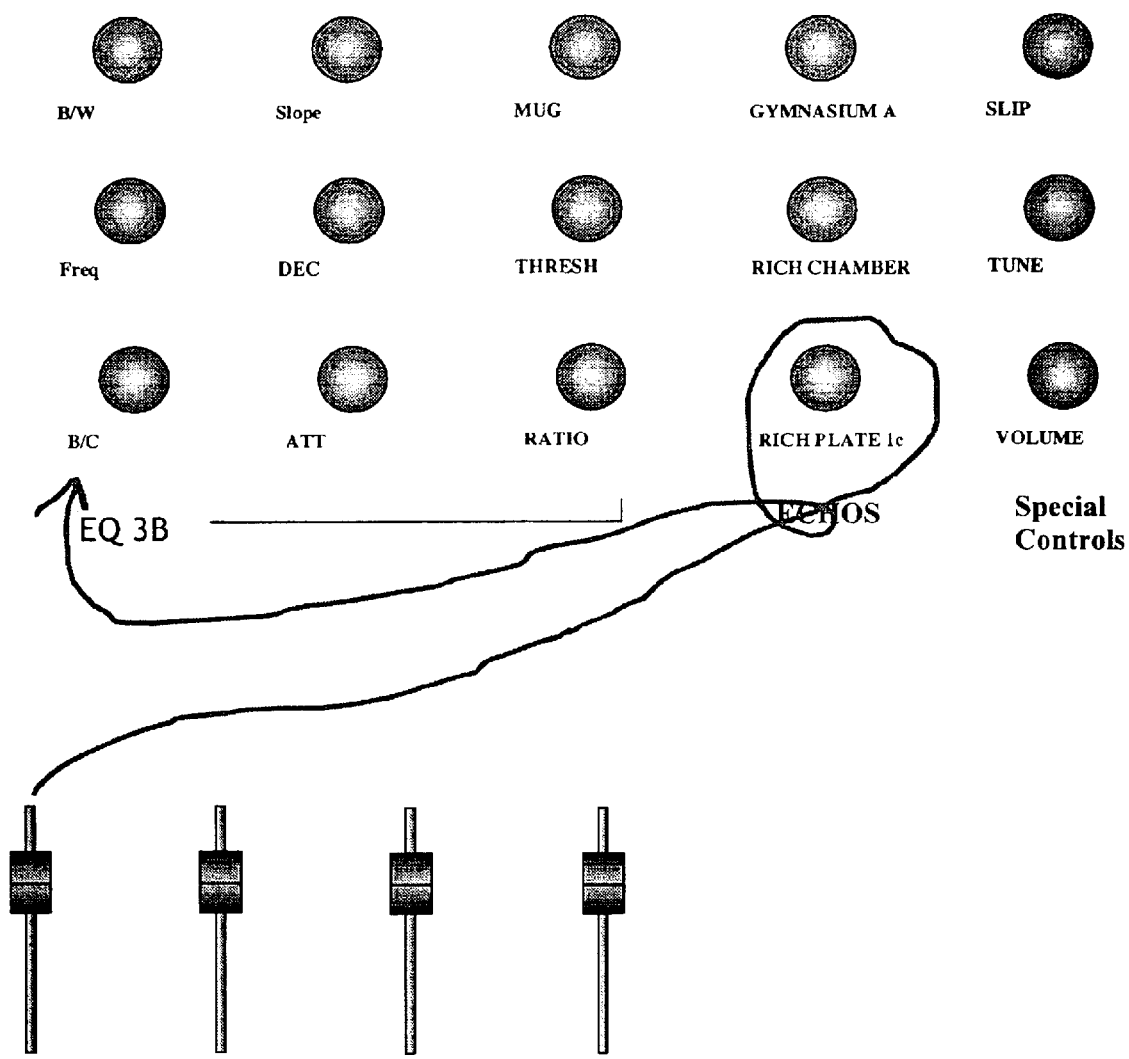
FIG. 38 is a depiction of an arrow used to reorder the path of a signal through multiple elements of an exemplary on-screen signal processing setup.

In another example, shown in FIG. 36, a curved line is drawn about the volume control, with an arrow extending therefrom to the input of EQ 3B. This arrow transaction commands that the volume control function is placed at the input of the EQ, whereby the input to the EQ 3B is first attenuated or increased by the volume control. Likewise, drawing an arrow from the volume label to intersect the label "EQ 3B", as shown in FIG. 37, applies the volume control function of the knob controller to the input signal of the EQ. In a further example, shown in FIG. 38, an arrow is drawn from one fader controller, to and about the Rich Plate echo control, and then to the input of EQ 3B. The direction and connections of this arrow commands that the output of the leftmost fader (at the tail of the arrow) is fed first to the Rich Plate echo control, and then to the input of EQ 3B at the head of the arrow.

In the examples of FIGS. 35–38, the contexts of the drawn arrows determine the transactions imparted by the arrows; that is, an arrow drawn from one or more controllers to another one (or more) controllers will direct a signal to take that path. This context may supercede any color or style designations of the drawn arrows, or, alternatively, may require a default color as described in the foregoing specification.

Figure 39:
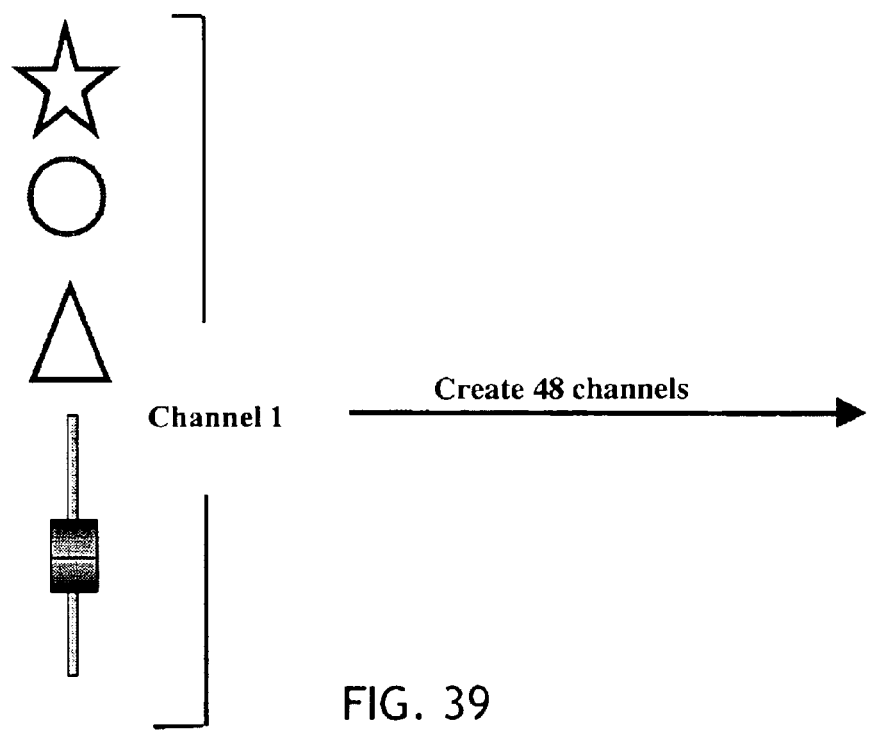
FIG. 39 is a depiction of an arrow used to generate one or more copies of one or more on-screen objects.

Another use of specialty arrows is to create multiple copies of screen objects, and place these copies on a screen display according to a default or user defined setup. This feature enables a user to create one or more copies of a complex setup and have them applied according to a default template or according to a user defined template that could be stored in the Info Window for this particular type of action. For example, as shown in FIG. 39, a combination of functional screen objects, such as a fader controller, and a triangle, circle, and star, any of which may represent functional devices for signal processing, are bracketed and labeled "Channel 1". For instance, the triangle could equal a six band equalizer; the circle, a compressor/gate; and the star, an echo unit. An arrow is then drawn from the Channel 1 label to an empty space on the screen. As the arrow flashes, the stem of the arrow is modified by the input (spoken, written or typed) "Create 48 channels." The system interprets this instruction and arrow as a command to produce 48 channels, all of which have the construction and appearance of Channel 1. The action indicated is: "Copy the object that the arrow is drawn from, as many times as indicated by the text typed near the arrow stem pointing to blank space. Furthermore, copy this object according to the default template for console channels." The default may be, for example, place 8 console channels at one time on the screen and have these channels fill the entire available space of the screen, etc. The specialty arrow is once again controlled by context, not by color or style: the tail of the arrow is proximate to an object or group of objects, the head of the arrow is not proximate to any screen object, and the arrow is labeled to make a specified number of copies. Note that the label of the arrow may simply state "48" or any other suitable abbreviation, and if the system default is set to recognize this label as a copy command, the arrow transaction will be recognized and implemented.

A further specialty arrow is one used to exchange or swap one or more aspects of two different screen objects. The arrow is a double headed arrow that is drawn between the two objects to be involved in the exchange transaction. This double headed arrow head creates a context that can only be "swap" or "exchange". The other part of the context is the two objects that this double headed arrow is drawn between.

Figure 40A:
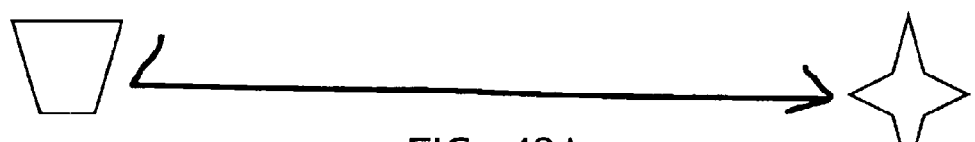
FIG. 40A is a depiction of a typical double-ended arrow hand-drawn onscreen to evoke a swap transaction between two on-screen objects.
Figure 40B:
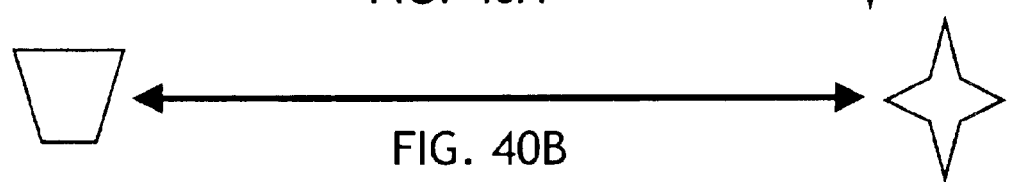
FIG. 40B is a depiction of a double ended arrow created on the onscreen display to replace the hand drawn entry of FIG. 40A.

To facilitate recognition of a wide range of screen objects, the system may provide a default that the double headed arrow must be drawn as a single stroke. As shown in FIG. 40A, the start of the arrow (at the left) is a half arrowhead and the end of the arrow is a full arrowhead. This is a very recognizable object that is unique among arrow logics and contextually determinative. Once recognized, the drawn arrow is replaced by a display arrow (FIG. 40B) that can flicker until touched to confirm the transaction. The list of aspects that may be swapped has as least as many entries as the list given previously for possible copy functions:

Aesthetic Properties
Swap the color of the object, the shape of the object, the line thickness of the object, the size of the object, or all aesthetic properties (except location) between the objects at the head and tail of the arrow.

Definition
Swap the definitions of the objects at the head and tail of the arrow.

Action
Swap of action of the objects at the head and tail of the arrow.

Assignment
Swap of assignment of the objects at the head and tail of the arrow.

Function
Swap the function of the objects at the head and tail of the arrow.

Automation
Swap the automation of the objects at the head and tail of the arrow.

Info Window
Swap the Info Window of the objects at the head and tail of the arrow.

Figure 41:
FIG. 41 is a depiction of an arrow hand-drawn on-screen.
Figure 42:
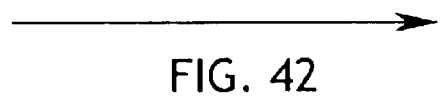
FIG. 42 is a depiction of a single-ended arrow created on-screen to replace the hand drawn entry of FIG. 41.

The technique for arrow entry of FIG. 39, shown in FIGS. 41–43, involves the initial drawing of an arrow, as shown in FIG. 41, followed by the presentation of a flickering arrow on the display (FIG. 42). Thereafter, the user may place a text cursor within a default distance to the flickering arrow (FIG. 43), and speak, write or type a simple phrase or sentence that includes key words recognized by the software (as described with reference to FIG. 3). These words may be highlighted after entry when they are recognized by the system. As previously indicated in FIG. 39, the recognized command of the phrase or sentence is applied to the adjacent arrow, modifying the transaction it conveys. In addition, as an extension of this technique, the user may first enter the phrase or sentence that expresses the desired transaction on the screen, and then draw an arrow within a default distance to the phrase or sentence, in order for the arrow and text command to become associated. Likewise, typing or speaking a new command phrase or sentence within a default distance of an existing arrow on-screen may be used to modify the existing arrow and alter the transaction conveyed by the arrow. Note: a spoken phrase would normally be applied to the currently flickering arrow.

Figure 45:
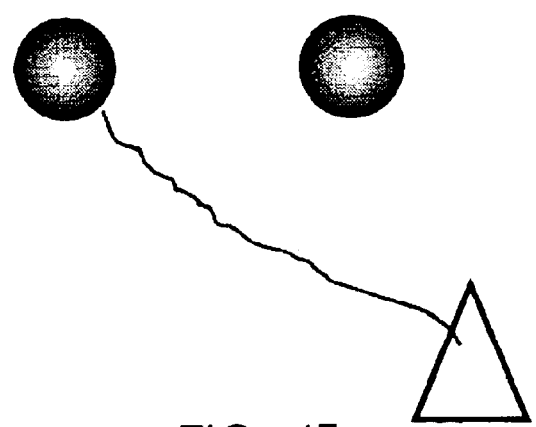
FIG. 45 is a depiction of a line without an arrowhead used and recognized as an arrow to convey a transaction from the leftmost knob controller to the triangle object.

With regard to FIG. 45, the arrow logic system programming may recognize a line as an arrow, even though the line has no arrow head. The line has a color and style which is used to define the arrow transaction. Any line that has the exact same aesthetic properties (i.e., color and line style) as an arrow may be recognized by the system to impart the transaction corresponding to that color and line style.

Figure 46:
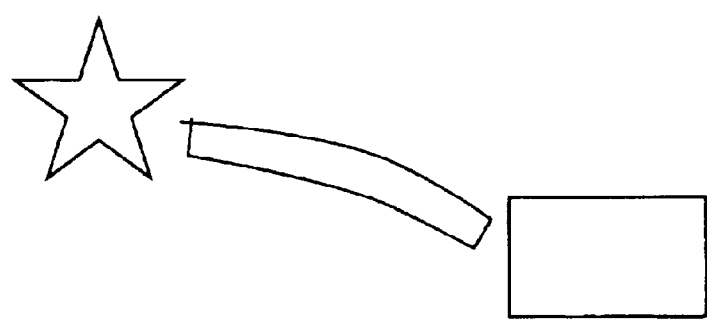
FIG. 46 is a depiction of non-line object recognized and used as an arrow to convey a transaction between screen objects.

As shown in FIG. 46, any shape drawn on a graphic display may be designated to be recognized as an arrow. In this Figure, a narrow curved rectangular shape drawn between a star object and a rectangle object is recognized to be an arrow that imparts a transaction between the star and the rectangle.

Definitions

Arrow: An arrow is an object drawn in a graphic display to convey a transaction from the tail of the arrow to the head of the arrow. An arrow may comprise a simple line drawn from tail to head, and may (or may not) have an arrowhead at the head end. The tail of an arrow is at the origin (first drawn point) of the arrow line, and the head is at the last drawn point of the arrow line. Alternatively, any shape drawn on a graphic display may be designated to be recognized as an arrow. The transaction conveyed by an arrow is denoted by the arrow's appearance, including combinations of color and line style. The transaction is conveyed from one or more objects associated with the arrow to one or more objects (or an empty spaced on the display) at the head of the arrow. Objects may be associated with an arrow by proximity to the tail or head of the arrow, or may be selected for association by being circumscribed (all or partially) by a portion of the arrow. The transaction conveyed by an arrow also may be determined by the context of the arrow, such as the type of objects connected by the arrow or their location. An arrow transaction may be set or modified by a text or verbal command entered within a default distance to the arrow, or by one or more arrows directing a modifier toward the first arrow. An arrow may be drawn with any type of input device, including a mouse on a computer display, or any type of touch screen or equivalent employing one of the following: a pen, finger, knob, fader, joystick, switch, or their equivalents. An arrow can be assigned to a transaction.

Arrow configurations: An arrow configuration is the shape of a drawn arrow or its equivalent and the relationship of this shape to other graphic objects, devices and the like. Such arrow configurations may include the following: a perfectly straight line, a relatively straight line, a curved line, an arrow comprising a partially enclosed curved shape, an arrow comprising a fully enclosed curved shape, i.e., an ellipse, an arrow drawn to intersect various objects and/or devices for the purpose of selecting such objects and/or devices, an arrow having a half drawn arrow head on one end, an arrow having a full drawn arrow head on one end, an arrow having a half drawn arrow head on both ends, an arrow having a fully drawn arrow head on both ends, a line having no arrow head, and the like. In addition, an arrow configuration may include a default, gap which is the minimum distance that the arrow head or tail must be from an object to associate the object with the arrow transaction. The default gap for the head and tail may differ.

Arrow logic: A transaction conveyed by an arrow (as defined herein).

Show Arrow command: Any command that enables a previously disappeared arrow to reappear. Such commands can employ the use of geometry rules to redraw the previous arrow to and from the object(s) that it assigns its arrow logic to. The use of geometry rules can be used to eliminate the need to memorize the exact geometry of the original drawing of such arrow.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. In an electronic device that accepts graphic entries and includes a screen display, a method for programming of said device, including the steps of:

inputting at least one object on said screen display;

using an input device to draw at least one arrow, said arrow having a configuration recognized by software to associate said at least one arrow with said at least one object; said arrow conveying a transaction relating to said at least one object, said configuration including a portion of said arrow circumscribing said at least one object;

further including a plurality of said portions, each circumscribing at least one on-screen object, all of said circumscribed on-screen objects being associated with said arrow.

2. The method for programming an electronic device of claim 1, further including a further object disposed within a distance to the head end of said arrow, said transaction being directed by said arrow to be carried out from said plurality of circumscribed objects to said further object.

3. In an electronic device that accepts graphic entries and includes a screen display, a method for programming of said device, including the steps of:

inputting at least one object on said screen display;

using an input device to draw at least one arrow, said arrow having a configuration recognized by software to associate said at least one arrow with said at least one object; said arrow conveying a transaction relating to said at least one object;

wherein said configuration includes at least one vertex formed in a portion of said at least one arrow, said at least one vertex being disposed within a user definable distance to said at least one object, whereby each vertex may select an on-screen object to be associated with said at least one arrow.

4. The method for programming an electronic device of claim 3, including a further object disposed within a user definable distance to the head end of said arrow, said transaction being directed by said arrow to be carried out from said at least one selected object to said further object.

5. In an electronic device that accepts graphic entries and includes a screen display, a method for programming of said device, including the steps of:

inputting at least one object on said screen display;

using an input device to draw at least one arrow, said arrow having a configuration recognized by software to associate said at least one arrow with said at least one object; said arrow conveying a transaction relating to said at least one object;

wherein said at least one arrow includes a double-headed arrow having a first end associated with said at least one on-screen object, and having an opposed, second end associated with a further on-screen object, said double-headed arrow conveying a swap transaction between said at least one on-screen object and said further on-screen object.

6. In an electronic device that accepts graphic entries and includes a screen display, a method for programming of said device, including the steps of:

inputting at least one object on said screen display;

using an input device to draw at least one arrow, said arrow having a configuration recognized by software to associate said at least one arrow with said at least one object; said arrow conveying a transaction relating to said at least one object;

wherein said transaction comprises directing a plurality of electronic signals from said at least one object to a further on-screen object disposed within a user definable distance to the front end of said at least one arrow, said transaction including summing said plurality of signals before entering said further on-screen object.

* * * * *